(12) United States Patent
Accossato et al.

(10) Patent No.: US 8,915,534 B2
(45) Date of Patent: Dec. 23, 2014

(54) GUIDE FOR A SLIDING DOOR, IN PARTICULAR OF A VEHICLE, AND MANUFACTURING METHOD THEREOF

(71) Applicant: Coproget S.R.L., Rivalta di Torino (Torino) (IT)

(72) Inventors: Angelo Accossato, Turin (IT); Claudio Accossato, Turin (IT)

(73) Assignee: Coproget S.R.L., Rivalta di Torino (IT)

( * ) Notice: Subject to any disclaimer, the term of this patent is extended or adjusted under 35 U.S.C. 154(b) by 0 days.

(21) Appl. No.: 13/975,107

(22) Filed: Aug. 23, 2013

(65) Prior Publication Data
US 2014/0062124 A1 Mar. 6, 2014

(30) Foreign Application Priority Data
Aug. 31, 2012 (IT) .............................. TO2012A0754

(51) Int. Cl.
| | |
|---|---|
| B60J 5/06 | (2006.01) |
| E05D 15/06 | (2006.01) |
| E05D 15/10 | (2006.01) |
| B21D 7/00 | (2006.01) |

(52) U.S. Cl.
CPC .............. B60J 5/06 (2013.01); *E05Y 2800/45* (2013.01); *E05Y 2900/531* (2013.01); E05D 15/101 (2013.01); E05D 15/0652 (2013.01); *B21D 7/00* (2013.01)
USPC ....................................................... 296/155

(58) Field of Classification Search
CPC ........ B60J 5/06; E05D 15/06; E05D 15/0652; E05D 15/0686; E05D 15/063; E05D 15/0634; E05D 15/0626; E05D 15/0621; E05D 15/0639; E05D 15/0643; E05D 15/0647; E05D 15/066; E05D 15/6665; E05D 15/0669; E05D 15/0673; E05D 15/0678; E05D 15/0682; E05D 15/0691; E05D 15/1005; E05D 15/1007; E05D 15/101; E05D 15/1015
USPC ........ 296/155; 49/213, 209; 16/87 R, 87.4 R, 16/95 R, 96 R
See application file for complete search history.

(56) References Cited

U.S. PATENT DOCUMENTS

| | | | | |
|---|---|---|---|---|
| 4,152,872 | A * | 5/1979 | Tanizaki et al. .................. | 49/214 |
| 4,413,444 | A * | 11/1983 | Chikaraishi ..................... | 49/409 |
| 6,550,848 | B2 * | 4/2003 | Kleemann ...................... | 296/155 |
| 6,779,832 | B2 * | 8/2004 | D'Assumcao ................. | 296/155 |
| 7,261,364 | B2 * | 8/2007 | Tanigawa ....................... | 296/155 |
| 8,235,453 | B2 * | 8/2012 | Hull, Jr. .......................... | 296/155 |
| 2012/0167468 | A1 * | 7/2012 | Hozumi et al. ................. | 49/209 |

FOREIGN PATENT DOCUMENTS

| | | |
|---|---|---|
| DE | 10 2008 021802 A1 | 11/2008 |
| WO | 2005/028794 A1 | 3/2005 |

\* cited by examiner

*Primary Examiner* — Gregory Blankenship
(74) *Attorney, Agent, or Firm* — Workman Nydegger

(57) ABSTRACT

A guide (10) for a sliding door, in particular of a vehicle (V), includes: a first straight section (11), a second straight section (12), a curved section (11C), in particular the curved section (11C) being located between the first straight section (11) and the second straight section (12), the guide (10) including a first portion (20) having a substantially inverted U-shaped cross-section and including a first side wall (21), an intermediate wall (21I) and a second side wall (22) facing the first side wall (21). The first straight section (11) and the second straight section (12) of the guide (10) include an intermediate wall (21I) so realized as to include at least one corrugation (23).

14 Claims, 4 Drawing Sheets

GUIDE FOR A SLIDING DOOR, IN PARTICULAR OF A VEHICLE, AND MANUFACTURING METHOD THEREOF

CROSS-REFERENCE TO RELATED APPLICATIONS

This application claims priority to Italian Application No. TO2012A000754, filed Aug. 31, 2012, which is incorporated herein by specific reference.

BACKGROUND OF THE INVENTION

1. The Field of the Invention

The present invention relates to a guide for a sliding door, in particular of a vehicle. Furthermore, the present invention relates to a related method for manufacturing a guide for a sliding door, in particular of a vehicle.

2. The Relevant Technology

At the state of the art, it is known a guide for a sliding door, in particular of a vehicle, comprising a first straight section, a curved section and a second straight section, said curved section being located between the first and the second straight section.

As it is known, the first and the second straight section of the guide are of a variable length (usually depending on the type of vehicle) and allow the sliding of the door relative to the vehicle associated thereto, while the curved section of the guide allows the door to come out from the shape or contour of the vehicle.

Furthermore, such a guide of the known type is realized in such a way that it comprises a first portion having a substantially inverted U-shaped cross-section and comprising a first side wall, an intermediate wall and a second side wall facing said first side wall.

Said first guide portion is adapted to receive at least one first rolling element associated with the door of said vehicle, said first rolling element being guided by the first and second side wall of said first portion in order to accompany the door while passing from a closing condition to an open condition, and vice versa.

Usually, said at least one first rolling element is constituted by a wheel, which is associated to the first portion of the guide in such a way as to have a first rotation axis substantially vertical.

The guides known in the art are then usually made in such a way as to include a second substantially L-shaped portion and provided with a first strip coupled to the first side wall of the first portion and a second substantially horizontal strip facing the intermediate wall of the first portion.

In such an embodiment, said second strip constitutes a substantially horizontal support surface for at least one second rolling element associated with the door of said vehicle, so as to hold the door of the vehicle while passing from the closed condition to the open position, and vice versa.

Usually, also said at least one second rolling element is constituted by at least one wheel, which is associated to the second portion of the guide in such a way as to have a substantially horizontal rotation axis (i.e., a rotation axis substantially parallel to the second strip of the second portion, facing the intermediate wall of the first portion).

However, the above described guide has drawbacks.

Since the curved section of the sliding guide is usually realized by an apparatus for bending and stretching profiles (said apparatuses being generally known as "stretch and bending" apparatuses), the sliding guide is made such as to have a certain clearance between the rolling element and the first portion of the guide, in particular in correspondence of said first and second straight section of the guide.

In fact, during the stretch and bending operations of the profile, in said curved section of the sliding guide the material tends to stretch and draw more material toward the outside of the curved section, causing a decrease of the distance between the first and the second side wall of the substantially U-formed first section.

Consequently, in the guides known at the state of the art, the clearance compared to the first rolling element that the first portion of the guide has in correspondence of the rectilinear sections is necessary in order to achieve a curved section in which the distance between the first and the second side wall of said first section is sufficiently large to allow the passage of said first rolling element associated with a door, in particular of a vehicle.

Thus, it is apparent that the guides known in the art are made, in particular in correspondence of the rectilinear sections, in such a way to have a clearance that does not allow to accurately and precisely guide the rolling element associated with the door.

Furthermore, it is obvious that such a clearance would cause undesired noise during the passage of the door from a closed condition to an open condition, and vice versa; in addition, this clearance does not allow an optimal operation of the system.

Some documents of the prior art are intended to solve the above drawbacks by different solutions.

For example, in order to compensate the clearance between the rolling elements and the guide, document WO2005028794A1 discloses the use of a trolley comprising a pair of rollers fixed on opposite sides of a rod for guiding the door during its opening and closing movements, said rod being pivoted to the guide and being associated with an elastic element adapted to maintain the contact of each wheel with the guide walls.

However, this solution has some drawbacks, since it is affected by the weight of the door and by the wear that determine a malfunction of the elastic element and of the other components of the system, in particular during the time. As a result, document WO2005028794A1 does not allow to find a solution that will be effective and durable.

Also document DE102008021802A1 aims to provide a solution to the problems resulting from the implementation of a clearance in the guide rail.

In particular, said document provides for the realization of said sliding guide in a substantially U-shaped first portion and a L-shaped second portion separated therebetween, so as to carry them out with a reduced tolerance of production and combine them later, for example during their attachment to the vehicle.

However, also this solution has some drawbacks, since it appears to be excessively complex and requires times and costs of realization and assembly really excessive.

SUMMARY OF THE INVENTION

In this frame, it is the main object of the present invention to overcome the above-mentioned drawbacks by indicating a guide for a sliding door, in particular of a vehicle, made in such a way as not to have a clearance between the rolling element and the first portion of the guide, in particular between the first rolling element and the straight sections of the first and second side wall of said first portion.

In particular, an object of the present invention is to realize the guide for a sliding door, in particular of a vehicle, in such a way to have enough space for the passage of the first rolling element in each section of said guide, without having to carry out larger sections than necessary in order to obtain a clearance between said rolling element and the guide.

Accordingly, an object of the present invention is to indicate a guide for a sliding door, in particular of a vehicle, made in such a way that accurately guide the rolling element associated with the port.

It is further object of the present invention to provide a guide for a sliding door, in particular of a vehicle, realized in such a way that both will not cause an undesired noise during the passage of the door from a closed condition to an open condition, and vice versa, and as to allow an optimal operation of the system.

It is another object of the present invention to provide a guide for a sliding door, in particular of a vehicle, made in such a way as to constitute a solution that can be effective and durable, without requiring time and cost of realization and assembly really excessive.

Said objects are achieved by the present invention through a guide for a sliding door, in particular of a vehicle, and a related method for manufacturing the same, incorporating the features set out in the annexed claims, which represent an integral part of the present description.

BRIEF DESCRIPTION OF THE DRAWINGS

Further objects, features and advantages of the present invention will become apparent from the following detailed description and annexed drawings, which are supplied by way of non-limiting example, wherein.

DETAILED DESCRIPTION OF THE PREFERRED EMBODIMENTS

Referring now to the description of the annexed drawings, with the reference number 10 is indicated, as a whole, a guide for a sliding door, in particular of a vehicle V, according to the present invention. It should be noted that said sliding door is not shown in the attached figures, while in FIGS. 3a and 3b only a portion of said vehicle V is shown.

Figure 1:
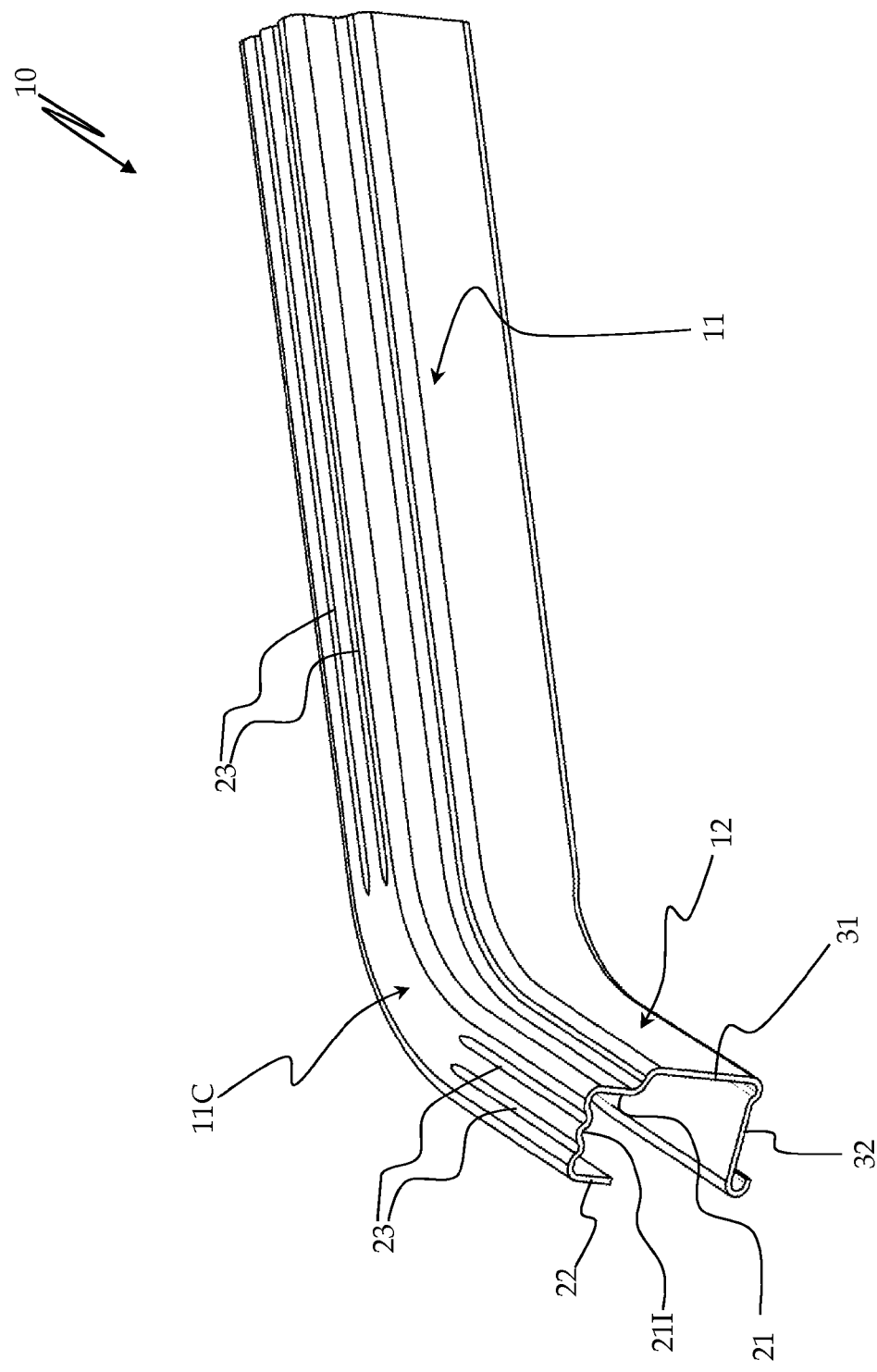
FIG. 1 is a perspective view of a guide for a sliding door, in particular of a vehicle, according to the present invention.
Figure 2:
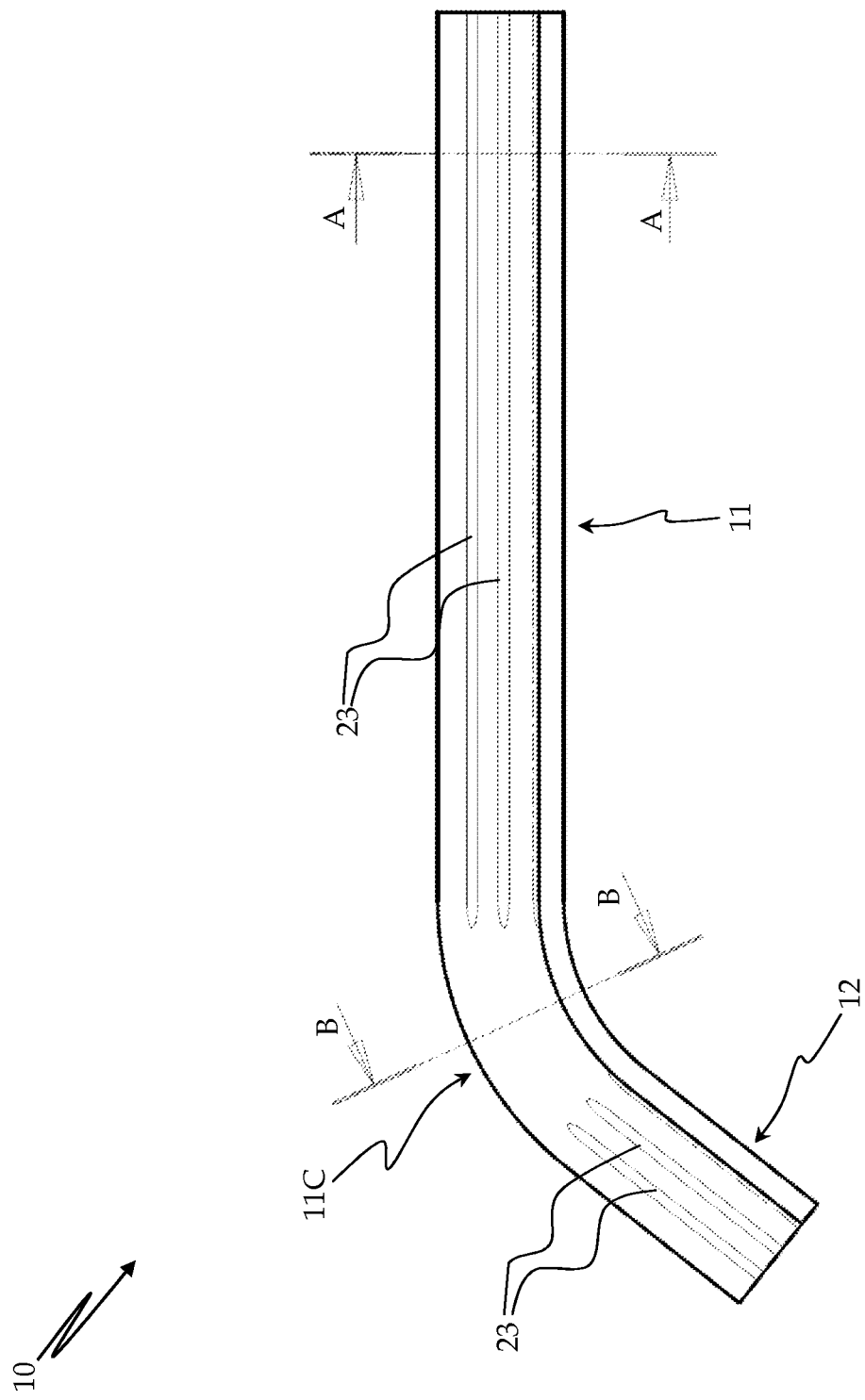
FIG. 2 is a plan view of the guide of FIG. 1.

As can be seen from the perspective view of FIG. 1 and the plan view of FIG. 2, said guide 10 comprises a first straight section 11, a curved section 11C and a second straight section 12, in particular said curved section 11C being located between the first straight section 11 and the second straight section 12.

In particular, the first straight section 11 and the second straight section 12 allow the sliding of the door relative to the vehicle V to which it is associated, while the curved section 11C allows the door to come out from the shape of the vehicle V during the opening operations of the door and returning to said shape of the vehicle V during the closing operations of said door.

Preferably, the first straight section 11 has a length greater than that of the second straight section 12.

Figure 3B:
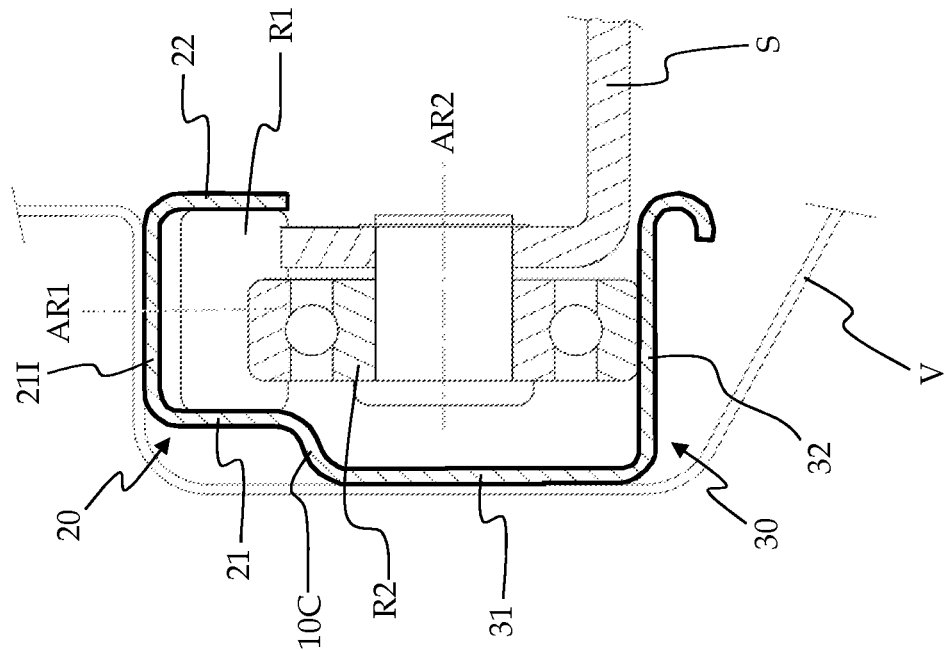
FIGS. 3a and 3b show a sectional view of the guide according to the present invention, respectively along a straight line along a straight line A-A and B-B of FIG. 2.
Figure 3A:
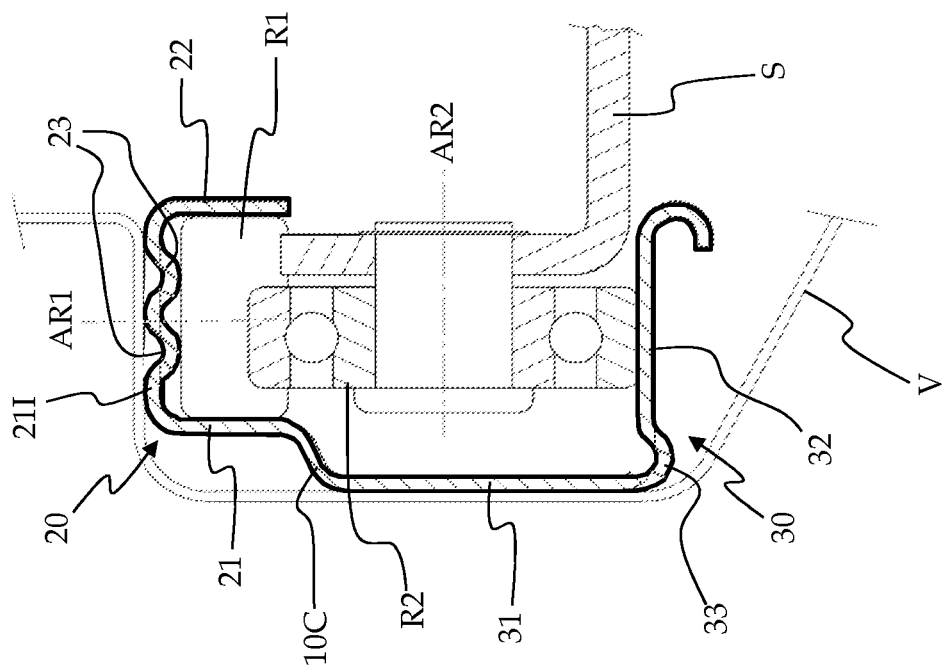

The FIGS. 3a and 3b show a sectional view of the guide 10 respectively along a straight line A-A and along a straight line B-B of FIG. 2.

Observing said FIGS. 3a and 3b it should be noted that the guide 10 comprises a first portion 20 having a substantially inverted U-shaped cross-section and comprising a first side wall 21, an intermediate wall 21I and a second side wall 22 facing said first side wall 21; preferably, said first side wall 21 and second side wall 22 are substantially parallel.

It is clear that said inverted U-shaped form of the first portion 20 refers to a section of the guide 10 and to a condition wherein the guide 10 is in operative condition, i.e., when it is associated with a respective vehicle.

The first portion 20 of the guide 10 is adapted to receive at least one first rolling element R1 associated with the door of said vehicle V, in particular said first rolling element R1 being guided by the first side wall 21 and the second side wall 22 of said first portion 20 in order to accompany the door while going from a closed condition to an open condition, and vice versa.

In particular, said at least one first rolling element R1 is constituted by a wheel, which is associated to the first portion 20 of the guide in such a way as to present a first rotation axis AR1 (represented in FIGS. 3a and 3b by means of a dashed-dotted line) substantially vertical.

The guide 10 further comprises a second portion 30 which is substantially L-shaped and includes a first strip 31 coupled to the first side wall 21 of the first portion 20 and a second strip 32 facing the intermediate wall 21I of the first portion 20.

In particular, said second strip 32 is substantially horizontal when the guide 10 is associated with the respective vehicle. It is clear that also said L-shaped second portion 30 refers to a condition in which the guide 10 is in operative condition, i.e., when it is associated with a respective vehicle.

In a preferred embodiment, said first portion 20 and second portion 30 are made as one piece; in particular, the guide 10 can be so realized as to comprise a connection section 10C through which the first strip 31 of the second portion 30 is coupled to the first side wall 21 of the first portion 20. In Figures from 3a to 4b it should be noted that said connection section 10C has a curved shape; however, it is clear that the connection section 10C may also have different conformations.

The second strip 32 substantially horizontal of the second portion 30 constitutes a support surface for at least one second rolling element R2 associated with the door of said vehicle V, in such a way to support the door of the vehicle V while going from the closed condition to the open condition, and vice versa.

Typically, also said at least one second rolling element R2 is constituted by at least one wheel, which is associated to the second portion 30 of the guide 10 in such a way as to have a second rotation axis AR2 (also represented in FIGS. 3a and 3b by means of a dashed-dotted line) substantially horizontal (i.e., substantially parallel to the second strip 32 of the second portion 30).

Furthermore, said first rolling element R1 and second rolling element R2 are associated to the door of the vehicle V by means of connecting means known at the state of the art, for example comprising at least one bracket S (shown in FIGS. 3a and 3b).

Figure 4B:
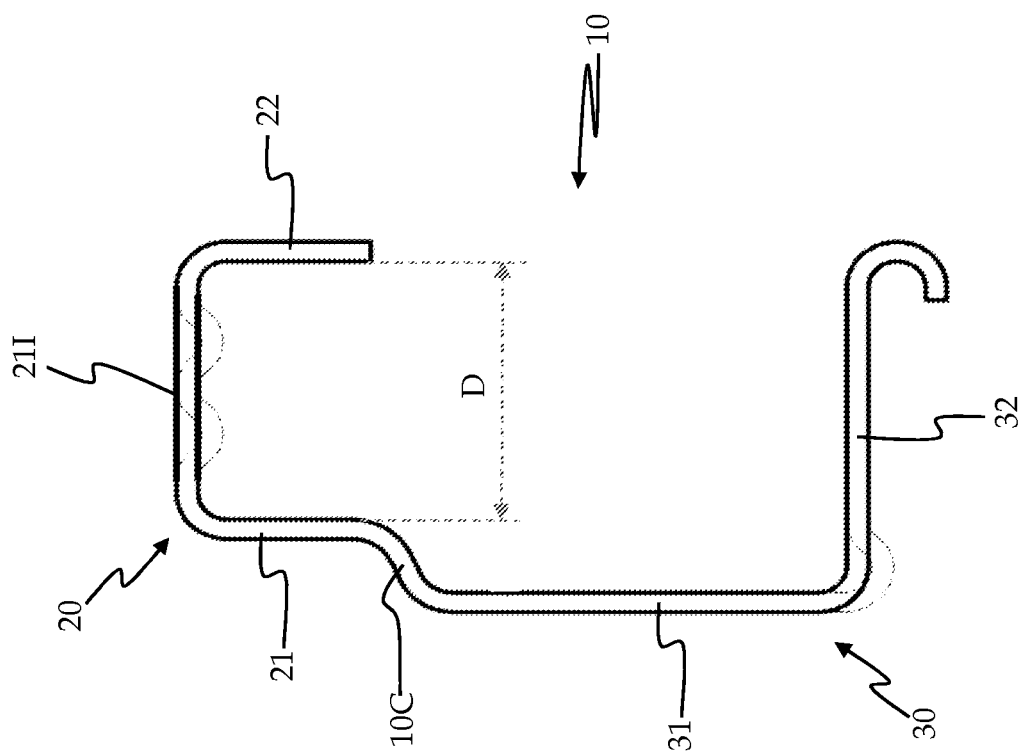
FIGS. 4a and 4b show a simplified view of the guide represented in sections referred to FIGS. 3a and 3b.
Figure 4A:
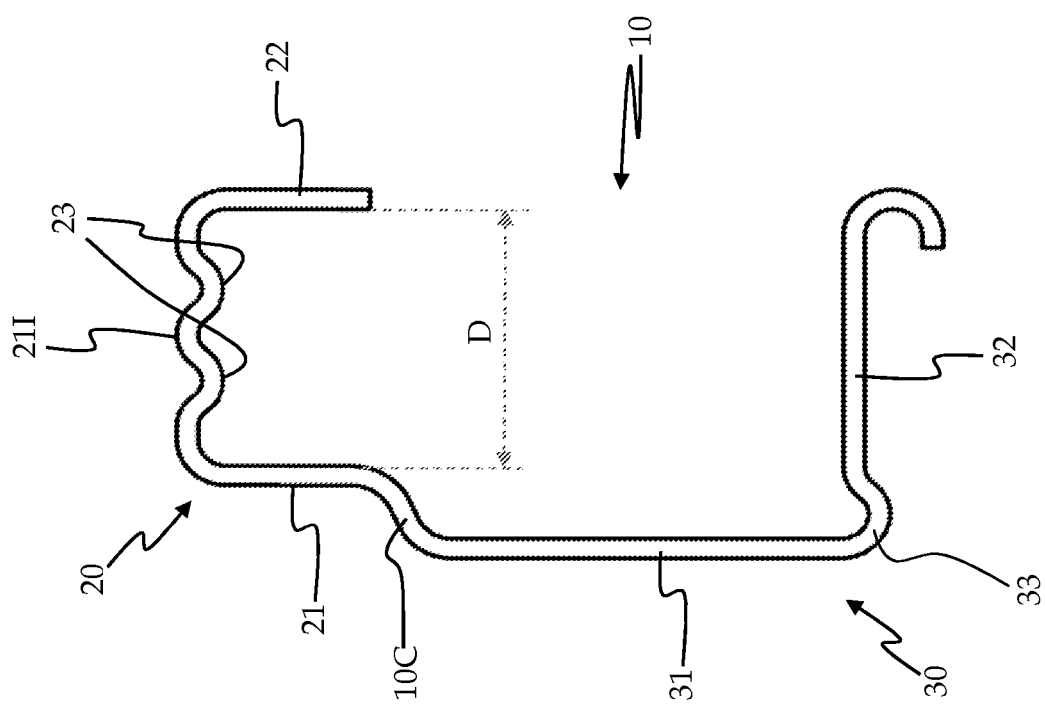

It should be noted that FIGS. 4a and 4b respectively represent a simplified view of the same section of the guide 10 referred to FIGS. 3a and 3b, as in FIGS. 4a and 4b the portion of the vehicle V, the rolling elements R1, R2 and the related means of connection to the door of the vehicle V are not represented.

In accordance with the present invention, the first straight section 11 and the second straight section 12 of the guide 10 comprise an intermediate wall 21I so realized as to comprise at least one corrugation 23.

In particular, said at least one corrugation 23 is obtained through a step of profiling the guide 10 according to the present invention.

As can be seen from FIGS. 3b and 4b, said at least one corrugation 23 comprises a plurality of corrugations 23.

In addition, the curved section 11C of the guide 10 comprises an intermediate wall 21I so realized as to have a substantially straight extension in a sectional view.

In particular, said substantially straight extension of the intermediate wall 21I in the curved section 11C is obtained through a step of stretching and bending the guide 10 aimed at obtaining said curved section 11C.

The particular provisions of the present invention substantially allow to accumulate material that will be used to compensate for the elongation of the material and the retrieval of additional material in order to realize the curved section 11C of the guide 10 during the so-called "stretch and bending".

In particular, the realization of the intermediate wall 21I according to the teachings of the present invention allows to maintain the second side wall 22 at a determined distance D (see FIGS. 4a and 4b) from the first side wall 21 substantially unchanged both in straight sections 11, 12 of the guide 10 (the section of said rectilinear sections 11, 12 being shown in FIGS. 3a and 4a), and in the curved section 11C of the guide 10 (the section of said curved portion 11C being shown in FIGS. 3b and 4b).

It is clear that the maintenance of a same distance D between the side walls 21, 22 in each section of the guide 10 allows to realize said guide 10 in such a way as not to have a clearance between the first rolling element R1 and the side walls 21, 22 of the first portion 20 of the guide 10, in particular in correspondence of the straight sections 11, 12 of the guide 10.

Consequently, the guide 10 according to the present invention is realized in such a way that accurately guide the first rolling element R1 associated with the door.

Additionally, the guide 10 according to the present invention is conceived in such a way that both will not cause an undesired noise during the passage of the door from a closed condition to an open condition, and vice versa, and as to allow an optimal operation of the sliding system of the door.

It is therefore clear that the guide 10 according to the present invention constitutes an effective and durable solution without requiring realization time and cost of realization and assembly really excessive.

According to a preferred embodiment, said first straight section 11 and second straight section 12 of the guide 10 comprise at least one additional corrugation 33 obtained on said second portion 30 of the guide 10.

In particular, said at least one further corrugation 33 is located substantially in correspondence of the coupling region between the first strip 31 and second strip 32 of the second portion 30, however, it is clear that said at least one further corrugation 33 may also be positioned in a different way.

Furthermore, said at least one further corrugation 33 is obtained through a step of profiling the guide 10 according to the present invention.

Even the provision of said at least one further corrugation 33 allows substantially to accumulate material that will be used to compensate for the elongation of the material and the retrieval of additional material required in order to achieve the curved section 11C of the guide 10 during the "stretch and bending" operations ( ).

Indeed, such an accumulation of material in correspondence of the first straight section 11 and of the second straight section 12 allows to obtain a second strip 32 of the second portion 30 of the guide 10 made with dimensions substantially constant along the whole guide 10, i.e., with dimensions which allow to constitute a support surface suitable for at least one second rolling element R2 associated to the door of said vehicle V.

In the following, a method for manufacturing a guide 10 for a sliding door, in particular of a vehicle V, according to the present invention is described.

In particular, said method comprises at least a step a) of making said guide 10 in a manner that it comprises a first portion 20 having a substantially inverted U-shaped cross-section and comprising a first side wall 21, an intermediate wall 21I and a second side wall 22 facing said first side wall 21, in particular said first portion 20 being so realized as to be adapted to receive at least one first rolling element R1 associated with the door of said vehicle V.

Preferably, said step a) is carried out through the realization of said first side wall 21 and second side wall 22 so as to be substantially parallel.

In accordance with the present invention, said method comprises the following steps of:

b) making said intermediate wall 21I in a manner such that it has at least one corrugation 23;

c) obtaining a curved section 11C of the guide 10 through a step of stretching and bending said guide 10, said step c) being so carried out as to utilize the material accumulated in said at least one corrugation 23 to compensate for the elongation of the material occurring during said stretching and bending step.

Preferably, said step b) is carried out through a step of profiling the guide 10.

The method according to the present invention may then comprise the step a1) of making said guide 10 in a manner such that it comprises a second portion 30 having a substantially L-shaped cross-section and including a first strip 31 coupled to the first side wall 21 of the first portion 20 and a second strip 32 facing the intermediate wall 21I of the first portion 20, said second strip 32 being adapted to create a support surface for at least one second rolling element R2 associated with the door of said vehicle V.

Preferably, said step a1) is carried out through a step a2) of making said second portion 30 of the guide 10 in a manner such that it has at least one additional corrugation 33, in particular substantially located in correspondence of the coupling region between the first strip 31 and the second strip 32 of said second portion 30.

In particular, also said step a2) is carried out through a step of profiling the guide 10.

According to the method object of the present invention, said steps a) and a1) are preferably carried out through the realization in a single piece of said first portion 20 and second portion 30.

In particular, the method according to the present invention may then comprise a step a3) of realizing the guide 10, in particular by means of a profiling operation of said guide 10, in a manner such that it comprises a connection section 10C through which the first strip 31 of the second portion 30 is coupled to the first side wall 21 of the first portion 20.

The advantages of a guide 10 for a sliding door, in particular of a vehicle V, and of a related method for manufacturing said guide 10 according to the present invention are apparent from the above description.

In particular, these advantages consist in the fact that the special provisions of the present invention allow substantially to accumulate material that will be used to compensate for the elongation of the material and for the retrieval of additional material in order to achieve the curved section 11C of the guide 10 during the steps of stretching and bending.

In particular, the realization of the intermediate wall 21I according to the teachings of the present invention allows to maintain the second side wall 22 at a given distance D from the first side wall 21 substantially unchanged in both the straight sections 11, 12 of the guide 10, both in the curved section 11C of said guide 10.

Maintaining a same distance D between the side walls 21, 22 in each section of the guide 10 allows to realize said guide 10 such as not to have a clearance between the first rolling element R1 and the side walls 21, 22 of the first portion 20 of the guide 10, in particular in correspondence of the straight sections 11, 12 of the guide 10.

As a consequence, the guide 10 according to the present invention is realized in such a way that the rolling element associated with the door is accurately and precisely guided.

Additionally, the guide 10 according to the present invention is conceived in such a way that both will not cause an undesired noise during the passage of the door from a closed condition to an open condition, and vice versa, and as to allow an optimal operation of the system of the sliding door.

It is therefore clear that the guide 10 according to the present invention constitutes an effective and durable solution without requiring time and cost of realization and assembly really excessive.

A further advantage of the present invention is constituted by the realization of an additional corrugation 33 on said second portion 30 of the guide 10, as also said at least one additional corrugation 33 allows substantially to accumulate material that will be used to compensate for the elongation of the material and the retrieval of additional material required in order to realize the curved section 11C of the guide 10 during the steps of stretching and bending. This allows to obtain a second strip 32 of the second portion 30 of the guide 10 realized with dimensions substantially constant along the whole guide 10, i.e., with dimensions that allow to constitute a support surface suitable for at least one second rolling element R2 associated with the door of said vehicle V.

It is however clear that many changes may be made to the guide and the method according to the present invention, and that in its practical implementation the various components may have different shapes and arrangements or be replaced with other technically equivalent elements without departing from the novelty spirit of the inventive idea.

It can therefore be easily understood that the present invention is not limited to the above-described guide and to the method, but may be subject to many modifications, improvements or replacements of equivalent parts and elements without departing from the inventive idea, as clearly specified in the following claims.

What is claimed is:

1. A guide for a sliding door of a vehicle, the guide comprising:
   a first straight section,
   a second straight section,
   a curved section located between the first straight section and the second straight section,
   a first portion having a substantially inverted U-shaped cross-section and comprising a first side wall, an intermediate wall and a second side wall facing said first side wall,
   wherein the first straight section and the second straight section of the guide comprise an intermediate wall so realized as to comprise at least one corrugation,
   and wherein the curved section of the guide comprises an intermediate wall so realized as to have a substantially straight extension in a sectional view.

2. The guide according to claim 1, wherein said at least one corrugation is obtained through a step of profiling the guide such that that at least one corrugation includes a plurality of corrugations.

3. The guide according to claim 1, wherein said substantially straight extension of the intermediate wall in the curved section is obtained through a step of stretching and bending the guide aimed at obtaining said curved section.

4. The guide according to claim 1, wherein the first portion of the guide is adapted to receive at least one first rolling element associated with the door of said vehicle, said first rolling element being guided by the first side wall and by the second side wall of said first portion in order to accompany the door while going from a closed condition to an open condition and vice versa.

5. The guide according to claim 1, further comprising a second portion which is substantially L-shaped and includes a first strip coupled to the first side wall of the first portion and a second strip facing the intermediate wall of the first portion.

6. The guide according to claim 5, wherein said first straight section and second straight section of the guide comprise at least one additional corrugation obtained on said second portion of the guide.

7. The guide according to claim 6, wherein said at least one additional corrugation is located substantially in correspondence of the coupling region between the first strip and the second strip of the second portion.

8. The guide according to claim 6, wherein said at least one additional corrugation is obtained through a step of profiling the guide such that the at least one additional corrugation includes a connection section.

9. The guide according to claim 5, wherein said first portion and said second portion are made as one piece, the guide being so realized as to comprise the connection section through which the first strip of the second portion is coupled to the first side wall of the first portion.

10. The guide according to claim 5, wherein said second strip of the second portion constitutes a support surface for at least one second rolling element associated with the door of said vehicle, in such a way as to support the door of the vehicle while going from the closed condition to the open condition and vice versa.

11. A method for manufacturing a guide for a sliding door, of a vehicle, said method comprising at least one step a) of making said guide in a manner such that it comprises a first portion having a substantially inverted U-shaped cross- section and comprising a first side wall, an intermediate wall and a second side wall facing said first side wall, said first portion being so realized as to be adapted to receive at least one first rolling element associated with the door of said vehicle,
   said method further comprising the following steps:
   b) making said intermediate wall in a manner such that it has at least one corrugation;
   c) obtaining a curved section of the guide through a step of stretching and bending said guide,
   said step c) being so carried out as to utilize the material accumulated in said at least one corrugation to compensate for the elongation of the material occurring during said stretching and bending step.

12. The method according to claim 11, wherein said step b) is carried out through a step of profiling the guide.

13. The method according to claim 11, further comprising a step a1) of making said guide in a manner such that it comprises a second portion having a substantially L-shaped cross-section and including a first strip coupled to the first side wall of the first portion and a second strip facing the intermediate wall of the first portion, said second strip being adapted to create a support surface for at least one second rolling element associated with the door of said vehicle.

14. The method according to claim 13, wherein said step a1) is carried out through a step a2) of making said second portion of the guide in a manner such that it has at least one additional corrugation substantially located in correspondence of the coupling region between the first strip and the second strip of said second portion, said step a2) being carried out through a step of profiling the guide.

* * * * *